United States Patent [19]

Sekino et al.

[11] Patent Number: 4,781,834
[45] Date of Patent: Nov. 1, 1988

[54] MEMBRANE SEPARATION APPARATUS

[75] Inventors: Masaaki Sekino; Katsuhisa Numata; Tetsuo Ukai, all of Otsu, Japan

[73] Assignee: Toyo Boseki Kabushiki Kaisha, Japan

[21] Appl. No.: 63,917

[22] Filed: Jun. 19, 1987

[30] Foreign Application Priority Data

Jun. 20, 1986 [JP] Japan .................. 61-145570

[51] Int. Cl.$^4$ .............................................. B01D 13/00
[52] U.S. Cl. .................... 210/321.88; 210/500.23
[58] Field of Search ............. 210/456, 321.88, 321.87, 210/321.79, 500.23

[56] References Cited

U.S. PATENT DOCUMENTS 3,957,648  5/1976  Roget et al. .................... 210/321.88
4,141,836  2/1979  Schael ............................. 210/456 X Primary Examiner—Frank Spear
Attorney, Agent, or Firm—Wegner & Bretschneider

[57] ABSTRACT

A membrane separation apparatus of hollow fiber type which comprises a hollow fiber package body in a cylindrical shape comprising a core pipe or tube available as a passage for a fluid and a hollow fiber layer surrounding said core pipe or tube, said hollow fiber layer being formed by arranging hollow fibers having a selective permeability around and on the outer surface of said core pipe or tube, characterized in that (1) at least two perforated holes are provided on the wall of said core pipe or tube at the position near either one of the entrance or exit of said passage so as to flow the fluid into the hollow fiber layer therethrough and (2) the outer surface of the hollow fiber package body is covered by a film non-permeable to the fluid but leaving uncovered the edge portion of the outer surface opposite to the edge portion where said hole is present on the wall of said core pipe or tube.

15 Claims, 3 Drawing Sheets

MEMBRANE SEPARATION APPARATUS

The present invention relates to a membrane separation apparatus. More particularly, it relates to an improved membrane separation apparatus of hollow fiber type comprising a core pipe or tube and a hollow fiber package body made by arranging hollow fibers around and on said core pipe or tube, the fiber walls of said hollow fibers having a selective permeability to a fluid, characterized in that the fluid can flow in the hollow fiber package body at a high flow rate and the high and stable separation efficiency is retained over a long period of time.

Membrane separation process is an operation to separate one or more components from a fluid comprising those components with or without any other component(s) by the use of a membrane having a selective permeability to said fluid. The field to which said process is applicable include gas permeation, liquid separation, dialysis, ultrafiltration, reverse osmosis, etc. Specific application examples of said process include conversion of sea water into fresh water, desalting of saline water, purification of waste water, condensing of fruit juice, refining of protein, separating of oil from its mixture with water, artificial kidney, artificial lung, etc. The membrane is used in the form of film, tube, hollow fiber or the like. A hollow fiber is specially advantageous in having a large membrane area per unit volume and good separation efficiency.

There have hitherto been made many proposals on the permeation separation apparatuses utilizing hollow fibers, of which an example is a hollow fiber package body made by arranging hollow fibers having a selective permeability around a core pipe or tube to form a set of flat bundles of hollow fibers, of which at least one end is solidified to make a resin wall. In the package body thus constructed, even and continuous supply of a fluid to be treated against overall surfaces of the hollow fibers without stagnation is essential for enhancement of separation efficiency. When the flow of a fluid to be treated at the membrane surface is uneven, stagnation occurs locally so that replacement of the fluid at such place becomes insufficient; dissolved substances or suspending substances are thus locally concentrated to deposit onto the membrane surface, whereby the separation performance of the membrane significantly deteriorates.

In a typical example of the conventional membrane separation apparatus using a hollow fiber package body, hollow fibers are packed substantially uniformly in a cylindrical casing to make a hollow fiber layer, and the respective hollow fibers penetrate the resinous walls at both terminals and open to the outsides of said resinous walls so that a fluid to be treated is supplied through an entrance provided on the cylindrical casing and discharged through an exit provided on such casing. In the above construction, the fluid can hardly penetrate into the deep portion of the hollow fiber layer so that a large portion of the fluid flows away along the outer part of the hollow fiber layer, i.e. along the inner wall the cylindrical casing. As the result, the membrane area where the membrane separation is achieved efficiently is narrowed, and the permeability per volume is small.

In Japanese Patent Publication (Unexamined) Nos. 63179/1977 and 110183/1979, there are disclosed membrane separation apparatuses improved in said defect and enhanced in permeability efficiency by assuring the even distribution of a fluid into the entire hollow fiber layer. However, the constructions in those apparatues are still not satisfactory. In the apparatus of the former, the hollow fibers are bonded with a resin only at the opening end and not bonded at the other end where is served as an entrance for a fluid to be treated. Because of this reason, the hollow fibers are unfixed or dislocated to produce shrinkage or movement, whereby an uneven flow is apt to be formed. In the apparatus of the latter, a plurality of pillars are inserted into the hollow fiber layer at the positions near both terminals of such hollow fiber layer in parallel to the resin walls to make the entrance and the exit for a fluid to be treated. At the stage of insertion of the pillars into the hollow fiber layer, serious damage may be given to the hollow fibers so that the separation performance is markedly deteriorated.

In another typical example of the conventional membrane separation apparatus, hollow fibers are arranged tightly and uniformly around a hollow pipe provided with many holes at the wall so that a fluid as supplied into the hollow pipe is distributed into the hollow fiber layer through said holes at the wall. This structure is preferred in making the distribution uniformly over the entire hollow fiber layer. However, since the fluid flows through the hollow fiber layer is not only in the lengthwise direction but also in the radial direction, the flow rate of the fluid through the hollow fiber layer is relatively small so that the fluid is apt to be biassed even with slight unevenness in the hollow fiber density at the hollow fiber layer. As the result, local concentration and deposition of dissolving or suspending substances at the membrane surfaces take place, and the seperation performance is lowered.

In view of the above drawbacks as seen in the conventional membrane separation apparatus, an extensive study has been made to provide any improved construction wherein a fluid to be treated can flow evenly over the entire hollow fiber layer with a large flow rate, i.e. without stagnation or bias flow at any local position, to give high separation efficiency, and such purpose has now been achieved by this invention.

According to the present invention, there is provided a membrane separation apparatus of hollow fiber type which comprises a hollow fiber package body in a cylindrical shape comprising a core pipe or tube available as a passage for a fluid and a hollow fiber layer surrounding said core pipe or tube, said hollow fiber layer being formed by arranging hollow fibers having a selective permeability around and on the outer surface of said core pipe or tube, characterized in that (1) at least two perforated holes are provided on the wall of said core pipe or tube at the position near either one of the entrance or exit of said passage so as to flow the fluid into the hollow fiber layer therethrough and (2) the outer surface of the hollow fiber package body is covered by a film non-permeable to the fluid but leaving uncovered the edge portion of the outer surface opposite to the edge portion where said hole is present on the wall.

The term "effective length" as hereinafter used is intended to mean the length of the hollow fiber package body between the resin walls provided at both edge portions of such package body, of which the one resin wall bonds the one edge of the hollow fibers together in an opening state and the other resin wall bonds the other edge of the hollow fiber together in a closed state.

In the above construction, the hollow fibers are preferably arranged around the core pipe or tube with an angle of not more than 60°, especially of not more than 45°, to the axis of said core pipe or tube to make a hollow fiber package body. Such arrangement is effective in enhancing the technical effect of said construction, i.e. the achievement of an even and smooth flow of the fluid.

The perforated hole(s) present on the wall of the core pipe or tube are provided preferably at the position of about 0.2 to 30% of the effective length from the edge portion of the hollow fiber layer bonded with a resin. More preferably, a plurality of perforated holes are provided circumferentially on the wall of the core pipe or tube. The size of each hole may be about 5 to 50% of the inner diameter of the core pipe or tube. Further, it is favorable that not less than three, more preferably not less than four, perforated holes are to be symmetrically provided around the axis on the circumferential wall of the core pipe or tube to assure an even distribution of the fluid to be treated.

The edge portion of the hollow fiber package body left uncovered may have a length of about 0.2 to 20%, particularly about 0.4 to 5%, of the effective length. When the uncovered length at the edge portion is shorter than 0.2% of the effective length, the pressure drop is too large so that the covered film is shifted or deformed and an adequate surface velocity cannot be achieved. When the uncovered length at the edge portion is longer than 20% of the effective length, the pressure drop is too small, so that a short pass is formed and uniform flow is not attained.

Referring to the accompanying drawings, the construction and the technical operation or effect of this invention will be hereinafter explained in detail.

Figure 1:
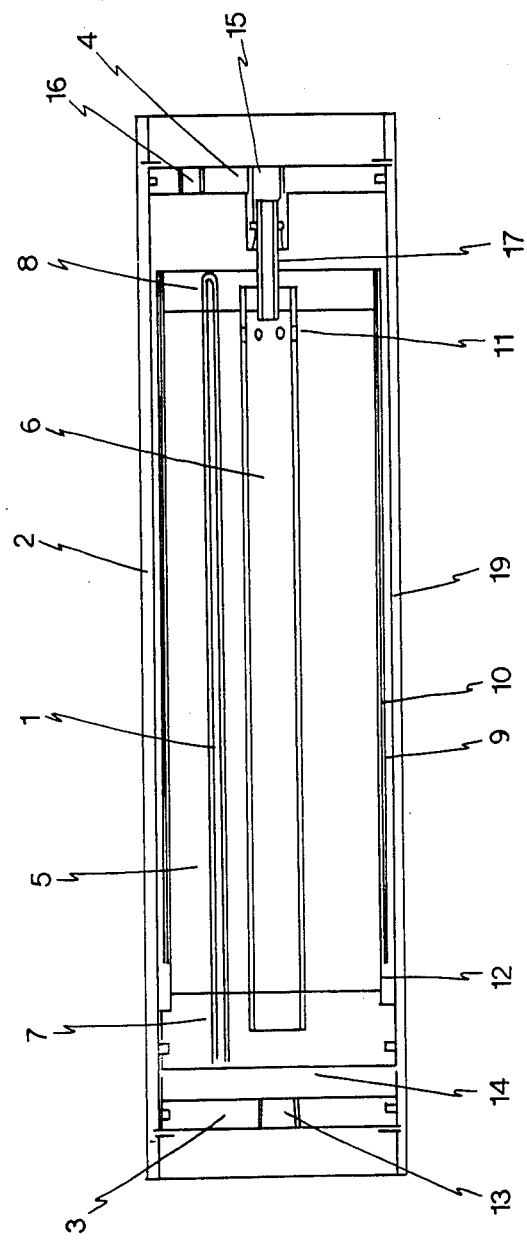
FIG. 1 is a sectional view of an embodiment of a membrane separation apparatus in accordance with the present invention.

In FIG. 1 showing a section view of the substantial portion of a membrane separation apparatus as an embodiment of the invention, 1 is a hollow fiber package body, 2 is a cylindrical container accommodating said hollow fiber package body and 3 and 4 are terminal plates. The hollow fiber package body 1 comprises a hollow fiber layer 5, a core pipe 6 and resin walls 7 and 8. The outer surface of the hollow fiber package body 1 is covered with a nonpermeable film 9 except the neighboring portion 12 to the resin wall 7 and further covered with a reinforcing support material 10. In the core pipe 6, a plurality of small holes 11, 11, --- are provided circumferentially on the wall near the terminal position in the hollow fiber layer 5. The hollow fibers are bonded together with a resin at the entrance terminal position in an opening state to make the resin wall 7 and at the exit terminal position in a closed state to make the resin wall 8. The terminal plate 3 has an exit 13 through which a permeated fluid is discharged, and a room 14 for temporary accommodation of the permeated fluid is formed between the terminal plate 3 and the resin wall 7. The terminal plate 4 has an entrance 15 through which a fluid to be permeated is supplied, and an exit 16 for a concentrated fluid.

For carrying out membrane separation due to reverse osmosis using the membrane separation apparatus as shown in FIG. 1, a fluid to be treated is supplied from the entrance 15 and enters through a conduit 17 into the passage in the core pipe 6. Then, the fluid flows through the holes 11, 11, --- provided on the wall of the core pipe 6 into the hollow fiber layer 5. The fluid is then distributed in the radial direction at the position near the resin wall 8 and further in the axial or longitudinal direction. At the position near the resin wall 7, the fluid flows again in the radial direction and is then discharged from the outer position 12 not covered with the non-permeable film 9. During the above flow, the fluid is permeated through the membrane wall of the hollow fiber by the reverse osmotic action. The permeated fluid is collected at the room 4 and taken out through the exit 13. On the other hand, the concentrated fluid coming out from the outer position 12 flows the annular passage 19 formed between the inner wall of the cylindrical container 2 and the outer surface of the hollow fiber package body 1 and is discharged through the exit 16.

Figure 2:
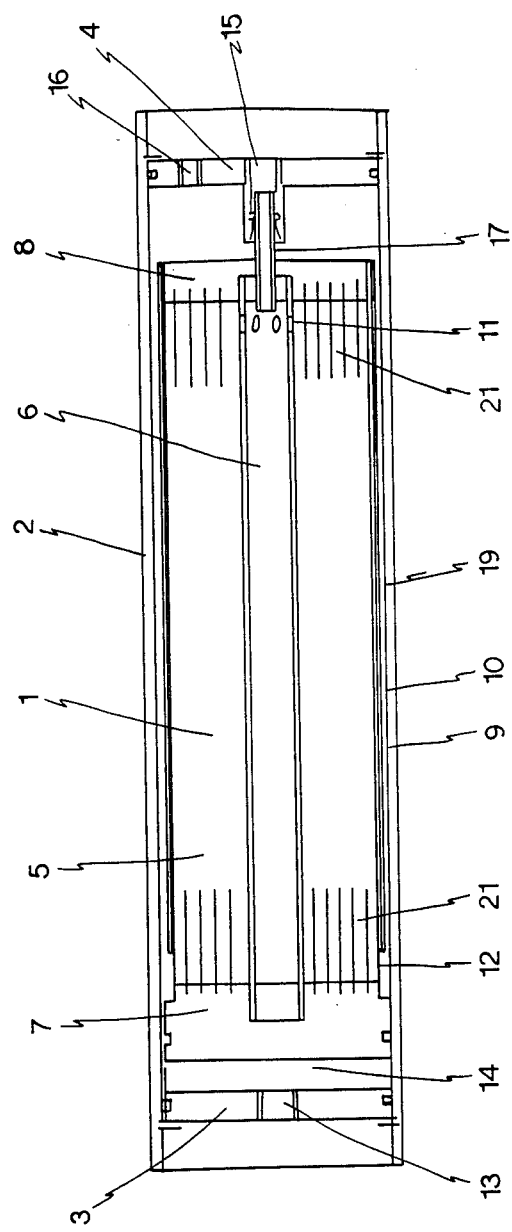
FIG. 2 is a sectional view of another embodiment of a membrane separation apparatus in accordance with the present invention.

FIG. 2 shows a section view of the substantial portion of a membrane separation apparatus as an another embodiment of the invention, which is more enhanced in the distribution effect of a fluid to be treated in the hollow fiber layer into the radial direction at the positions near the entrance and the exit. In this embodiment, a plurality of gauze-like cloths 21, 21, --- are inserted as spacing materials (or gap-forming materials) into the hollow fiber layer for the purpose of providing the hollow fiber layer with gaps at the positions near the resinous walls at both terminals so as to carry out the distribution of the fluid into the radial direction more efficiently. Instead of gauze-like cloths, rough fabric cloths, rough non-woven fabrics, round wound products of linear materials, etc. may be used as the spacing material. Preferably, the spacing material may have a length of about 20 to 300 mm in the longitudinal or axial direction and a thickness of about 0.1 to 3 mm and be arranged with a pitch of about 1 to 20 mm in the radial direction at the entrance and/or the exit in the hollow fiber layer. Also, the spacing material is preferred to have a larger void rate, usually of not less than about 2%. Further, the spacing material is preferred to be fixed in the resin wall at its one end, but this is not essential insofar as the gap-forming material is kept in such a state that it can perform good distribution of the fluid into the radial direction over a long period of time.

Figure 3:
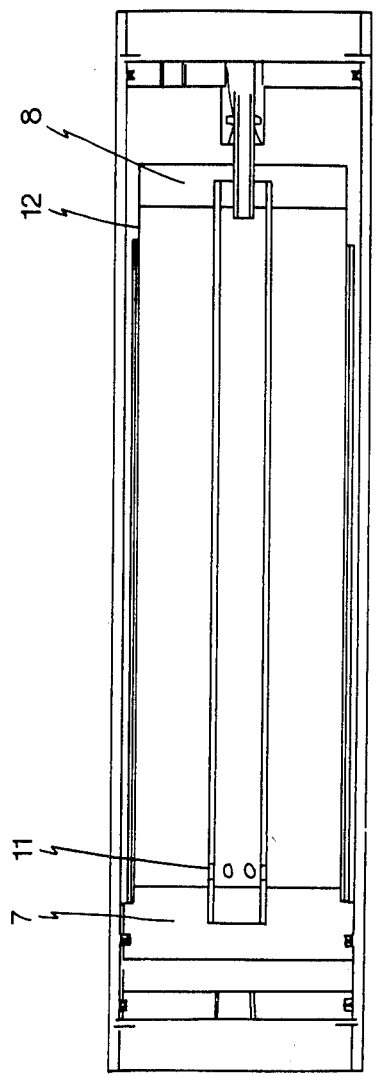
FIG. 3 is a sectional view of yet another embodiment of a membrane separation apparatus in accordance with the present invention.

FIG. 3 shows a section view of the substantial portion of a membrane separation apparatus as a further embodiment of the invention, where the entrance and the exit are provided in a different matter from that as shown in FIG. 1 or 2. In FIG. 3, the core pipe 6 has holes 11, 11, --- at the position near the resin wall 7, and the outer position 12 which is not covered by a nonpermeable film 9 is provided at the position near the resin wall 8.

In any embodiment as shown in FIGS. 1 to 3, the entrance and the exit for the fluid may be made contrary.

In comparison with a conventional membrane separation apparatus of hollow fiber where the core pipe has holes on the entire wall so that a fluid is distributed into the radial direction over the entire length, the membrane separation appatatus of this invention can give a linear flow rate 3 to 80 folds to a fluid. A large flow rate decreases production of bias flow and stagnation and lowers the thickness of the different concentration layer near the membrane surface characteristic to membrane separation so that the separation efficiency is enhanced.

As stated above, the hollow fibers in the hollow fiber layer are preferred to be arranged in such a manner that their angle to the core axis of the hollow fiber package body is not more than 60°. In this arrangement, the fine particles of dissolving or suspending substances in the fluid to be treated can readily pass through the membrane surfaces of the hollow fibers and the spaces among the hollow fibers without being caught by the hollow fibers.

Deposition of the dissolving or suspending substances onto the membrane surfaces is thus prevented, and the stable separation performance can be maintained over a long period of time. Particularly when the angle of the hollow fibers to the core axis is 45° or less, the above effect is remarkable.

The hollow fibers to be used in the present invention are not particularly limited, and any conventional one for membrane separation apparatuses of hollow fiber type may be employed. In general, they have an outer diameter of 10 to 1,000 microns and a hollow rate of 3 to 80%, and their membrane walls have a selective permeability to a fluid. The membrane walls of these hollow fibers may be either homogeneous, microporous or anisotropic, and the spinning method of these fibers may be either melt spinning, wet spinning, dry spinning or combination of them. Examples of the materials to constitute the hollow fibers are cellulosic polymers (e.g. cellulose acetate, hydroxyethyl cellulose, cyanoethyl cellulose, regenerated cellulose), vinyl polymers (e.g. polyvinyl alcohol, polyvinyl acetal, polyacrylonitrile, polyacrylate, polyethylene, polypropylene, polystyrene, polyvinyl chloride, polytetrafluoroethylene), polyelectrolyte complex of polystyrene sulfonate-polyvinyl benzyltrimethyl ammonium, polyamides (e.g. poly-L-glutamate, nylon 4, nylon 6, nylon 66, polydimethylpiperazine fumaramide, polydimethylpiperarazine isophthalamide, polydimethylpiperazine terephthalamide, polyparaxylylene adipamide, polyparaxylylene isophthalamide, polyparaxylylene terephthalamide, polymethaphenylene isophthalamide, polyparaphenylene terephthalamide), polyhydrazide, polyamide hydrazide, polybenzylimidazole, polyimidazopyrrolon, polycarbonate, polyphenylene oxide, polysulfone, polyethylene terephthalate, polybutylene terephthalate, silicon resin, collagen, etc.

As the core pipe or tube, a hollow cylindrical pipe or tube is normally used. However, its cross-section is not necessarily limited to be round and may be, for instance, pentagonal. Also, the core pipe or tube may be made of plastics, metals, ceramics or the like.

The resin for constructing the resin wall is preferably in a fluid state before curing and forms a hard solid by curing. Typical examples are epoxy resins, silicon resins, polyurethane resins, unsaturated polyester resins, polyester acrylate resins, etc. The resin walls are provided at both ends of the hollow fiber package body perpendicular to the axis thereof; the respective hollow fibers open outward thrusting through at one of the resin walls; and the space between the hollow fibers and the resin walls are sufficiently sealed against the fluid.

The non-permeable film to be used in this invention may be any one through which a fluid to be treated can not substantially permeate, and it is usually made of plastics, rubbers, etc. The reinforcing material surrounding the non-permeable film may be any linear or fabric material made of natural fibers, synthetic fibers, inorganic fibers, etc. Any bonding agent may be optionally applied onto such reinforcing material. By the use of the reinforcing material, the pressure difference between the inside and the outside of the hollow fiber package body can be well maintained.

In the membrane separation apparatus according to this invention, a fluid to be treated is supplied to the entire section of the hollow fiber layer at the position near the resin wall and then flow into the axis direction of the hollow fiber package body evenly at every position including the central position and the surface position in the hollow fiber layer. Since the flow rate is relatively great, neither bias flow nor stagnation is formed. Further, any fine particles suspended in the fluid can be forced to flow without deposition within the hollow fiber layer. This may be called "self-cleaning effect", and such effect is exerted particularly well when the arrangement of the hollow fibers is made in such a manner that their angle to the axis of the hollow fiber package body is not more than 60°.

The excellent technical effect of this invention will be hereinafter explained by way of examples.

EXAMPLE 1

Hollow fibers (diameter, 165 μm; hollow rate, 23% made of cellulose triacetate and having a selective permeability are arranged around and on the outer surface of a cylindrical core pipe having small holes circumferentially at the wall near one end in such a manner that the angle of the hollow fibers to the core axis is from 30° to 50° to make a hollow fiber layer having an outer diameter of 120 mm. The outer surface of the thus formed hollow fiber package body is covered with a polyethylene-made non-permeable film, which is further surrounded by a glass fiber cloth impregnated with an epoxy resin. The resultant hollow fiber package body is bonded with an epoxy resin at both ends so as to make the one ends of the hollow fibers closed and keep the other ends opened. The thus prepared hollow fiber package body is accommodated in a cylindrical casing to make a membrane separation apparatus as shown in FIG. 1.

Using this membrane separation apparatus, water containing silica (12 ppm) and calcium carbonate ion (60 ppm) was treated at 19° C. under an operation pressure of 3 megapascal with a recovery rate of 68%. Even after the continuous operation for 6 months, the salt removal rate was 98% of that at the initiation. Also, the amount of the permeated water was reduced only with 6% in comparison with that at the initiation. No deposition of any insoluble material was observed within the hollow fiber layer.

COMPARATIVE EXAMPLE 1

Using a conventional membrane separation apparatus having a similar construction to the one as in Example 1 but using a core pipe having small holes circumferentially at the wall over its entire length so that the fluid is distributed radially into the hollow fiber layer through those holes, the same water as in Example 1 was treated under the same conditions. After 700 hours, the flow resistance of the fluid in the apparatus was made twice that at the initiation, and the salt removal rate was decreased with 14 of that at the initiation. At this stage, the operation was stopped, and the hollow fiber package body was subjected to inspection, whereby deposition of calcium carbonate and silica was observed at various positions.

COMPARATIVE EXAMPLE 2

In the same manner as in Example 1 but making arrangement of the hollow fibers in such a manner that their angle to the axis of the hollow fiber package body is 75° to 80°, a membrane separation apparatus is constructed.

Using the thus constructed membrane separation apparatus, the same water as in Example 1 was treated under the same conditions. As a result of the continuous operation for 6 months, the salt removal rate was 96% of that at the initiation. Also, the amount of the permeated water was reduced with 10% in comparison with that at the initiation. Inspection of the hollow fiber package body at this stage showed deposition of calcium carbonate in a slight amount, i.e. as linear attachments.

What is claimed is:

1. A membrane separation apparatus of hollow fiber type which comprises a hollow fiber package body in a cylindrical shape having a core pipe or tube available as a passage for a fluid and a hollow fiber layer surrounding said core pipe or tube, wherein said hollow fiber layer being formed by arranging hollow fibers having a selective permeability around and on the outer surface of said core pipe or tube, comprising in that (1) at least two perforated holes are provided on the wall of said core pipe or tube at the position near either one of the entrance or exit of said passage so as to flow the fluid into the hollow fiber layer therethrough; and (2) are outer surface of the hollow fiber package body covered by a film which is non-permeable to the fluid but leaving uncovered the edge portion of the outer surface opposite to the edge portion where said hole is present on the wall of said core pipe or tube.

2. The membrane separation apparatus according to claim 1, wherein the edge portion of the hollow fiber package body left uncovered has a length of about 0.2 to 20% of the effective length.

3. The membrane separation apparatus according to claim 1, wherein the edge portion of the hollow fiber package body left uncovered has a length of about 0.4 to 5% of the effective length.

4. The membrane separation apparatus according to claim 1, wherein the hollow fibers are arranged with an angle of not more than 60° to the axis of the hollow fiber package body.

5. The membrane separation apparatus according to claim 1, wherein the hollow fibers are arranged with an angle of not more than 45° to the axis of the hollow fiber package body.

6. The membrane separation apparatus according to claim 1, wherein the hollow fibers are made of a cellulosic polymer.

7. The membrane separation apparatus according to claim 1, wherein at least one spacing material is inserted into the hollow fiber package body at the position for supplying or discharging the fluid near the resin wall.

8. The membrane separation apparatus according to claim 7, wherein the spacing material is provided with a length of about 20 to 300 mm in the longitudial or axis direction near the entrance or exit of the hollow fiber layer.

9. The membrane separation apparatus according to claim 7, wherein the spacing material is provided with a pitch of about 1 to 20 mm in the radial direction near the entrance or exit of the hollow fiber layer.

10. The membrane separation apparatus according to claim 7, wherein the spacing material has a void rate of not less than 2%.

11. The membrane separation apparatus according to claim 1, wherein the hole is provided at the position of about 0.2 to 30% of the effective length from the edge portion of the hollow fiber layer bonded with a resin.

12. The membrane separation apparatus according to claim 1, wherein the hole has a size of about 5 to 50% of the inner diameter of the core pipe or tube.

13. The membrane separation apparatus according to claim 1, wherein a plurality of holes are provided circumferentially on the wall of the core pipe or tube.

14. The membrane separation apparatus according to claim 1, wherein not less than three perforated holes are provided on the wall of core pipe or tube.

15. The membrane separation apparatus according to claim 1, wherein not less than four perforated holes are provided on the wall of core pipe or tube.

* * * * *